Patented May 27, 1952

2,598,077

UNITED STATES PATENT OFFICE 2,598,077

PREPARATION OF GAS-EXPANDED PLASTIC MATERIALS

Ruth L. Stander, Washington, D. C., assignor to United States Rubber Company, New York, N. Y., a corporation of New Jersey No Drawing. Application June 22, 1950, Serial No. 169,783

4 Claims. (Cl. 260—2.5)

This invention relates to the preparation of gas-expanded plastic materials, particularly to the preparation of closed-cell cellular rubber—with new organic chemical blowing agents adapted—on thermal decomposition, to yield nitrogen gas. Although the chemicals are primarily adapted to the production of closed-cell cellular rubber, they may also be used in the preparation of cellular rubber in which the cells are interconnecting as in so-called sponge rubber.

Although there are many chemicals that can be caused to liberate nitrogen gas for gas-expanding plastic materials capable of being set or cured, such as rubber, many of them lack other desirable attributes that are necessary for commercial use, namely, little or no toxicity, non-discoloring, or non-staining characteristics, low cost, ease of incorporation, and preparation, etc.

Accordingly, it is an object of this invention to provide a new class of efficient nitrogen-gas blowing agents which have many of the above desired characteristics and whose use therefore constitutes an improvement in this art. Other objects will be apparent from the hereinafter description.

The present chemical blowing agents are characterized by the grouping R—N=N—CR'$_3$ where R and R' each represent an aromatic radical, preferably of the benzene series.

The chemicals may be prepared by condensing a triaryl chloromethane and an aryl hydrazine followed by oxidation of the intermediate hydrazine compound, illustrated by the equations:

2 RNH·NH$_2$+Cl CR$_3$→
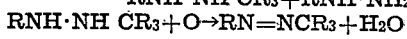
RNH·NH CR$_3$+RNH·NH$_2$—HCl
RNH·NH CR$_3$+O→RN=NCR$_3$+H$_2$O As oxidizing agents, one of the following may be used: amyl nitrate, chlorine, bromine, sodium hypochlorite, etc.

Suitable aryl azo triaryl methanes include: p-Chlorophenyl azo triphenyl methane—M. P. 105° C. (decomp.) Wieland et al. Berichte 55 1816 (1922); p-chlorophenyl azo tri p-tolyl methane—M. P. 116° C. (decomp.) Wieland et al. Berichte 55 1816 (1922); phenyl azo tri p-anisyl methane—M. P. 116° C. (decomp.) Wieland et al. Berichte 55 1816 (1922); p-tolyl azo triphenyl methane—M. P. 103-5° C. (decomp.) Gomberg and Campbell—J. A. C. S 20 780 (1898); o-nitro phenyl azo triphenyl methane—M. P. 116° C. (decomp.) Gomberg and Campbell—J. A. C. S. 20 780 (1898); m-chloro phenyl azo triphenyl methane—M. P. 109° C. (decomp.) Gomberg and Campbell—J. A. C. S. 20 780 (1898); alpha naphthyl azo triphenyl methane—M. P. 114° C. (decomp.) Gomberg and Campbell—J. A. C. S. 20 780 (1898); and phenyl azo triphenyl methane—M. P. 110° C. Gomberg—Berichte 30 2045 (1897).

The chemicals can be easily and completely mixed with the rubber or other organoplastic and do not impart an objectionable odor or color. They are, furthermore, non-staining to fabrics and coatings which may come in contact with the rubber or other organoplastic. They are also non-toxic.

The amount of the chemical, when used as the sole blowing agent should exceed 1% and can range up to 20%, or higher, by weight, based on the content of rubber or other organoplastic, depending upon the type of article being produced. However, as little as 0.1% may be used in conjunction with other blowing agents to obtain valuable effects. In the case of plastics other than natural or synthetic rubbers, the quantity of blowing agent may range as high as 30 or more parts, by weight, per 100 parts of the plastic.

The following examples are given to illustrate the invention, parts being by weight:

A rubber master batch was made up by combining the following ingredients on a rubber mill in the usual manner:

| | Parts by weight |
|---|---|
| Pale crepe | 100.0 |
| Zinc oxide | 5.0 |
| Whiting | 30.0 |
| Lithopone | 30.0 |
| Zinc salt of cocoanut oil fatty acids | 10.0 |
| Petrolatum | 10.0 |
| Sulfur | 3.0 |
| Dibenzothiazyl disulfide | 1.0 |
| Phenyl azo triphenyl methane | 3.0 |
| | 192.0 |

The rubber stocks were sheeted into ¼" sheets and discs 2⅞" in diameter were cut, each weighing about 40 grams. These were placed in circular molds measuring ¾" deep and 3" in diameter. The samples were then press cured for 20 minutes at the temperature of 60 pounds steam pressure. Upon removal from the molds each of the samples was obtained as a well-formed sponge disc, exhibiting a fine and uniform cellular structure.

Portions of the stock, after coating with white nitrocellulose lacquer and then dried and exposed to sunlight (5 days), showed little or no discoloration. The compounded rubber was also non-staining to cloth.

With the rubber may be incorporated the usual compounding ingredients, including curing or vulcanizing agents such as sulfur, accelerators, activators, anti-oxidants, plasticizers, softeners, pigments, fillers, dye-stuffs, etc. If desired, reclaimed rubber may be incorporated in the mix. The rubber may be first broken down on the mill whereupon the blowing agent may be added followed by other ingredients, curatives usually being added last. After compounding, I prefer to allow the stock to stand for a day or more before carrying out the blowing and curing step or steps.

The manipulative methods of treating the compounded stock to obtain the expanded product are those which are well-known and standard in the art. For details of the art of making chemically gas-expanded plastics such as rubber, attention may be directed to the article "Cellular Rubbers" by Gould appearing in Rubber Chemistry and Technology, Vol. 17, pp. 943–956 (October, 1944), and U. S. patents to Cuthbertson No. 2,291,213 and to Roberts et al. No. 2,299,593. It is well within the present skill of the art, in the light of this disclosure, to compound a stock containing my blowing agent and process it so as to obtain either a sponge or a closed cell type of product.

The decomposition temperatures for gas-expanding by means of the chemical blowing agents may range from 80° C. to 200° C. Accordingly, the organoplastic should be capable of setting to a normally solid state and have sufficient consistency and tensile strength at temperatures of from about 80° C. to about 200° C. to retain the expanded structure resulting from the subsequent heating step involving decomposition of the blowing agent with evolution of nitrogen and expansion of the mass either in the mold or when removed therefrom.

It is not intended to confine the invention to gas-expanding natural rubber, since it can be applied to other organoplastics, and mixes thereof, such as are shown in U. S. Patent No. 2,448,154, namely, alkyd resins, urea-formaldehyde resins, polymerized unsaturated materials such as polyacrylonitrile, polystyrene, polyvinyl chloride, copolymers of vinyl chloride and vinyl acetate, amorphous non-resinous plastic materials such as cellulose esters, cellulose ethers, synthetic rubbers such as the rubbery copolymers of butadiene and styrene or acrylonitrile, rubbery copolymers of isobutylene and butadiene or isoprene polychloroprene, polyisobutylene, olefin polysulfides, etc. The preferred aspect of the invention is concerned with chemically blown cellular rubber because of its wider commercial advantages, in competition with foamed rubber latex products.

The organoplastic may be of either the thermoplastic or the thermosetting type and it may be of a type of which polymerization is furthered or completed during the step of heating to generate the gas.

The invention is especially applicable to the expansion of rubber. Any type of rubber which is curable or vulcanizable to a solid state may be employed, examples being natural rubber or synthetic rubber-like or rubbery materials such as rubbery copolymers of an aliphatic conjugated diolefin such as butadiene or isoprene with a copolymerizable material such as styrene or acrylonitrile rubbery copolymers of olefins and diolefins such as that known in the art as "butyl" rubber which is the copolymer of isobutylene with a small proportion of an aliphatic conjugated diolefin such as butadiene or isoprene, polymerized halo-diolefins such as polymerized 2-chloro-1,3-butadiene, polymerized olefins such as polyisobutylene, polymeric organic sulfides such as olefin polysulfide, etc.

Having thus described my invention, what I claim and desire to protect by Letters Patent is:

1. The method of making a gas-expanded organoplastic material which comprises mixing an aryl azo triarylmethane of the formula R—N=N—CR'$_3$, where R is selected from the class consisting of aryl hydrocarbon, nitro-substituted aryl hydrocarbon, and chlor-substituted aryl hydrocarbon radicals, and R' is selected from the class consisting of aryl hydrocarbon and alkoxy-substituted aryl hydrocarbon radicals, with an organoplastic material which is capable of setting to a normally solid state and having sufficient consistency and tensile strength at temperatures of from 80° C. to 200° C. to retain the expanded structure resulting from the subsequent heating step, and decomposing said triarylmethane by heat to evolve nitrogen and expand said organoplastic material.

2. The method of making a gas-expanded rubber which comprises mixing an aryl azo triarylmethane of the formula R—N=N—CR'$_3$, where R is selected from the class consisting of aryl hydrocarbon, nitro-substituted aryl hydrocarbon, and chlor-substituted aryl hydrocarbon radicals, and R' is selected from the class consisting of aryl hydrocarbon and alkoxy-substituted aryl hydrocarbon radicals, with the rubber, decomposing said triarylmethane by heat to evolve nitrogen and expand said rubber, and curing the rubber to cause it to retain its expanded condition.

3. The method of making a gas-expanded organoplastic material which comprises mixing an aryl azo triarylmethane of the formula R—N=N—CR'$_3$, where R is selected from the class consisting of aryl hydrocarbon, nitro-substituted aryl hydrocarbon, and chlor-substituted aryl hydrocarbon radicals, and R' is selected from the class consisting of aryl hydrocarbon and alkoxy-substituted aryl hydrocarbon radicals, with an organoplastic material which is capable of setting to a normally solid state and having sufficient consistency and tensile strength at temperatures of from 80° C. to 200° C. to retain the expanded structure resulting from the subsequent heating step, decomposing said triarylmethane by heat to evolve nitrogen and expand said organoplastic material, and causing said organoplastic material to set and retain its expanded condition.

4. The method of making a gas-expanded rubber which comprises mixing phenyl azo triphenylmethane with the rubber, decomposing said triphenylmethane by heat to evolve nitrogen and expand said rubber, and curing the rubber to cause it to retain its expanded condition.

RUTH L. STANDER.

REFERENCES CITED

The following references are of record in the file of this patent:

UNITED STATES PATENTS

| Number | Name | Date |
| --- | --- | --- |
| 2,375,987 | Garvey | May 15, 1945 |
| 2,448,154 | Richmond et al. | Aug. 31, 1948 |

OTHER REFERENCES

Gomberg: J. A. C. S., vol. 20 (1898), pg. 780.